(12) United States Patent
Henshall et al.

(10) Patent No.: US 6,481,570 B1
(45) Date of Patent: Nov. 19, 2002

(54) PACKAGING ATMOSPHERE AND METHOD OF PACKAGING A MEMS DEVICE

(75) Inventors: Gordon D Henshall, Harlow (GB); Stephen Rolt, Herts (GB)

(73) Assignee: Nortel Networks Limited, St. Laurent (CA)

( * ) Notice: Subject to any disclaimer, the term of this patent is extended or adjusted under 35 U.S.C. 154(b) by 41 days.

(21) Appl. No.: 09/676,256

(22) Filed: Sep. 29, 2000

(51) Int. Cl.[7] .................... B65D 81/24; B65B 31/00
(52) U.S. Cl. .................. 206/213.1; 29/841; 385/15; 439/81; 53/403
(58) Field of Search .................... 206/213.1, 706, 206/710, 720; 361/818; 29/841; 439/81; 385/15; 53/403, 434

(56) References Cited

U.S. PATENT DOCUMENTS

| | | | | |
|---|---|---|---|---|
| 5,689,878 A | * | 11/1997 | Dahringer et al. | 206/720 |
| 6,188,814 B1 | * | 2/2001 | Bhalla | 385/15 |
| 6,267,605 B1 | * | 7/2001 | Biegelsen | 439/81 |

* cited by examiner

*Primary Examiner*—Bryon P. Gehman
(74) *Attorney, Agent, or Firm*—Lee, Mann, Smith, McWilliams, Sweeney & Ohlson

(57) ABSTRACT

The power handling capabilities and operational lifetime of a MEMS device, e.g., a MEMS mirror, operating in a high intensity optical beam environment are enhanced by packaging the device in an packaging atmosphere having a suitably high thermal conductivity, preferably exceeding that of air. The packaging atmosphere can be selected to provide a desired level of heat loss from the MEMS device.

22 Claims, 3 Drawing Sheets

PACKAGING ATMOSPHERE AND METHOD OF PACKAGING A MEMS DEVICE

The invention relates to a method of packaging a micro-mechanical systems (MEMS) device in a packaging atmosphere having a high thermal conductivity, and to a packaged MEMS device. The invention enables the MEMS device to accommodate higher power dissipation, to operate in a higher temperature environment than conventionally packaged devices and is capable of increasing the operational lifetime of the MEMS device.

BACKGROUND

Micro-mechanical systems (MEMS) devices are key components in photonic switches which switch optical signals at the optical layer. MEMS mirrors are used in photonic switches to reflect optical signals between input and output ports. A photonic switch usually consists of an array of MEMS mirrors. Each mirror is movable, for example in response to an electrical input, to switch incident light in direction by reflection from a mirror surface. The optical signals propagate in free space (as light beams) within the switch, and the MEMS mirrors are positioned by means of actuators so as to intercept the beams.

Depending on the actuators used, MEMS mirror devices fall into elastomeric, membrane and beam type devices. Beam type MEMS mirrors include torsion beams, cantilever beams and flexure beam devices. These beam type devices consist generally of a relatively thick reflector component mounted on an actuator which comprises a relatively thin beam. The mirror is moved into position by actuating the beam, for example, using electrical means.

MEMS devices are subject to mechanical failure problems as well as general erosion problems associated with deterioration of the reflective surface of the MEMS mirror. Both types of problems can be exacerbated by heat.

A MEMS mirror device is generally reflective only on one surface to enable heat to be dissipated from the non-reflective surface. The reflective surface is subject to long term degradation (wearout) through normal use and from sudden catastrophic failure through overloading a which can affect either the actuator motion or damage the mirror's reflective coating.

Normally, a temperature rise is generated by absorption of a small portion of the incident optical power by the mirror's reflective surface. The energy absorbed enhances the mobility of the atoms and molecules making up the mirror surface, and increases diffusion rates both tangentially across the mirror surface and into the mirror substrate. Any increase in temperature greatly increases the rate of these diffusion processes, promoting more rapid surface roughening and general degradation of the mirror's reflective coating.

At least two underlying mechanisms can affect the optical power range a mirror is capable of handling. Firstly, catastrophic failure when, for example, an extremely intense optical beam instantaneously damages the reflective coating due to thermal overstress. Secondly, slow degradation in the reflective surface due to sustained heating caused by absorption of optical power. Once the mirror coating has deteriorated to below an acceptable level, the whole MEMS device must be replaced. To ensure that the working lifetime of a MEMS mirror is acceptably long, it is desirable to set a limit on the power of the optical beams the mirror reflects.

It is known that the rate of degradation of a mirror surface is heat-dependent, the rate of degradation increasing as the temperature increases. The degradation of a reflective coating of a MEMS mirror surface can be reduced by increasing the efficiency of heat removal from the mirror coating, however, design constraints make this difficult to implement. Degradation arises from diffusion either tangentially or across the mirror coating layer into the mirror substrate. Diffusion induced damage can increase both the surface roughness and reduce the reflectivity of the mirror surface, and it is highly desirable to minimise diffusion in a MEMS mirror device.

Despite the effect that a build up of heat within a MEMS device has on increasing the rate of diffusion and accelerating the deterioration of the reflective mirror coating, it is difficult to provide safety mechanisms to limit heat building up during normal operational use of the MEMS device, much less control catastrophic power surges that may lead to more sudden failure.

To protect a MEMS device from moisture and contamination, it is known to hermetically seal the MEMS device within suitable packaging. Conventional methods includes simply sealing a MEMS device within an air atmosphere or selecting a nitrogen based packaging atmosphere. These atmospheres can inhibit oxidation and provides protection against moisture. Conventional packaging techniques select packaging atmospheres principally to provide some protection against moisture, and do not consider the thermal characteristics of the atmosphere.

SUMMARY OF THE INVENTION

One object of the invention seeks to mitigate or obviate the above disadvantages by providing a method of packaging a MEMS device in an atmosphere having a relatively high thermal conductivity compared to conventional packaging atmospheres.

Another object of the invention seeks to provide a MEMS device packaged in an atmosphere having a relatively high thermal conductivity compared to conventional packaging atmospheres.

Yet another object of the invention seeks to provide a packaging atmosphere having a relatively high thermal conductivity compared to conventional packaging atmosphere. The packaging atmosphere improves the level of thermal protection for a packaged MEMS device over that provided by conventional means.

A first aspect of the invention relates to a packaging atmosphere packaging a MEMS device, the packaging atmosphere selected to have a thermal conductivity exceeding the thermal conductivity of air. Preferably, the MEMS device has at least one thermally dependent characteristic, more preferably, at least one said thermally dependent characteristic affects the functionality of the MEMS device.

Preferably, the packaging atmosphere provided enables the MEMS device to handle a higher level of optical power than the level of optical power the MEMS device can handle when packaged in an atmosphere taken from the group of: air and nitrogen.

Preferably, the packaging atmosphere improves the thermal stability of the device.

Preferably, the packaging atmosphere has a thermal conductivity exceeding $0.03\ \text{Wm}^{-1}\text{K}^{-1}$.

Preferably, the packaging atmosphere includes helium.

Preferably, the thermal efficiency of the packaging atmosphere exceeds the thermal efficiency of air by a factor of 1.5.

A second aspect of the invention relates to a method of packaging a MEMS device, comprising:

a. selecting a packaging atmosphere which improves the thermal stability of the device; and b. hermetically sealing the MEMS device within the packaging atmosphere.

Preferably, the device is sealed in an packaging atmosphere having a thermal conductivity exceeding the thermal conductivity of air.

Preferably, the device is sealed in a packaging atmosphere having a thermal conductivity exceeding 0.03 $Wm^{-1}K^{-1}$.

Preferably, the packaging atmosphere is selected to have composition including a predetermined proportion of helium.

Preferably, the selected packaging atmosphere is helium.

A third aspect of the invention relates to a packaged MEMS device, the MEMS device having thermally dependent characteristics affecting its functionality, the packaged MEMS device comprising: a MEMS device surrounded by an packaging atmosphere and sealed within the packaging atmosphere by a packaging material, the packaging atmosphere having a thermal conductivity exceeding the thermal conductivity of air.

Preferably, the packaging atmosphere extends the range over which the device is thermally stable.

Preferably, the packaging atmosphere has a thermal conductivity exceeding 0.03 $Wm^{-1}K^{-1}$.

Preferably, the packaging atmosphere includes helium. More preferably, the packaging atmosphere including helium in a proportion taken from the group of: at least 5% wt; 5% wt to 10% wt; 50% wt to 75% wt; more than 75% wt; 100% wt.

Preferably, the thermal efficiency of the packaging atmosphere exceeds the thermal efficiency of air by a factor of 1.5.

Preferably, the MEMS device is a MEMS mirror-type device.

The packaged MEMS may further include an atmospheric circulator. The atmospheric circulator may be a fan. The MEMS device may be packaged so that the packaging atmosphere is drawn over surfaces of the MEMS device to increase the heat flow from the surfaces to the packaging atmosphere.

The MEMS device-is sealed within an atmosphere having a desired level of thermal conductivity. By selecting a packaging atmosphere surrounding the MEMS device having a high conductivity, heat is transported more rapidly from the surfaces of the mirror and its support to the surrounding atmosphere than in known packaging methods.

Whereas conventionally MEMS-type devices are immersed in nitrogen-type atmospheres so that moisture content can be controlled, the invention immerses the MEMS-type device in alternative atmospheric environment. The composition of the atmosphere is selected to provide a desired thermal property, for example, to increase heat flow from the mirror surfaces and/or supports.

A fourth aspect of the invention relates to an optical switch having a packaged MEMS mirror device, the packaged MEMS mirror device comprising a MEMS mirror device surrounded by a packaging atmosphere and sealed within the packaging atmosphere by a packaging material, the packaging atmosphere having a thermal conductivity exceeding the thermal conductivity of air.

It is advantageous for any MEMS device having thermally dependent characteristics affecting its operational performance to be packaged within a suitably thermally conductive atmosphere. By selecting a suitable packaging atmosphere, the operational performance of the device can be improved and the temperature range for operating the device increased. The operational lifetime of the device can be extended, and deterioration caused by the thermal dependence of certain characteristics of the device alleviated.

BRIEF DESCRIPTION OF THE DRAWINGS

The invention will now be described in more detail and with reference to the accompanying drawing, which is by way of example only, and in which.

DETAILED DESCRIPTION OF PREFERRED EMBODIMENTS

Figure 1:
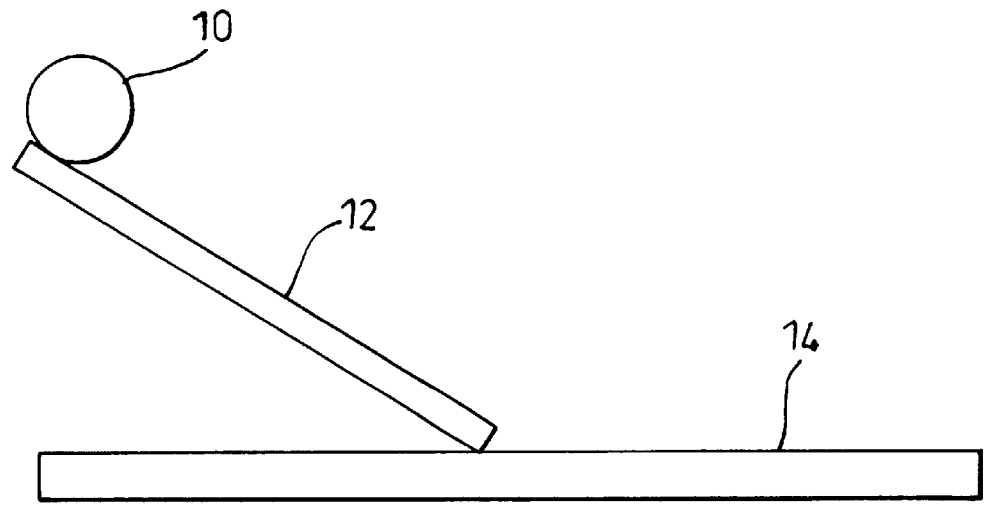
FIG. 1 is a sketch of a MEMS mirror device.

FIG. 1 sketches the basic features of a MEMS-type device capable of redirecting optical signals in a photonic switch. In FIG. 1, a MEMS mirror 10 is supported by an actuator, for example, beam 12. The actuator 12 is operated by an actuating mechanism (not shown) so as to move the mirror 10 relative to the fixed support 14.

Figure 2:
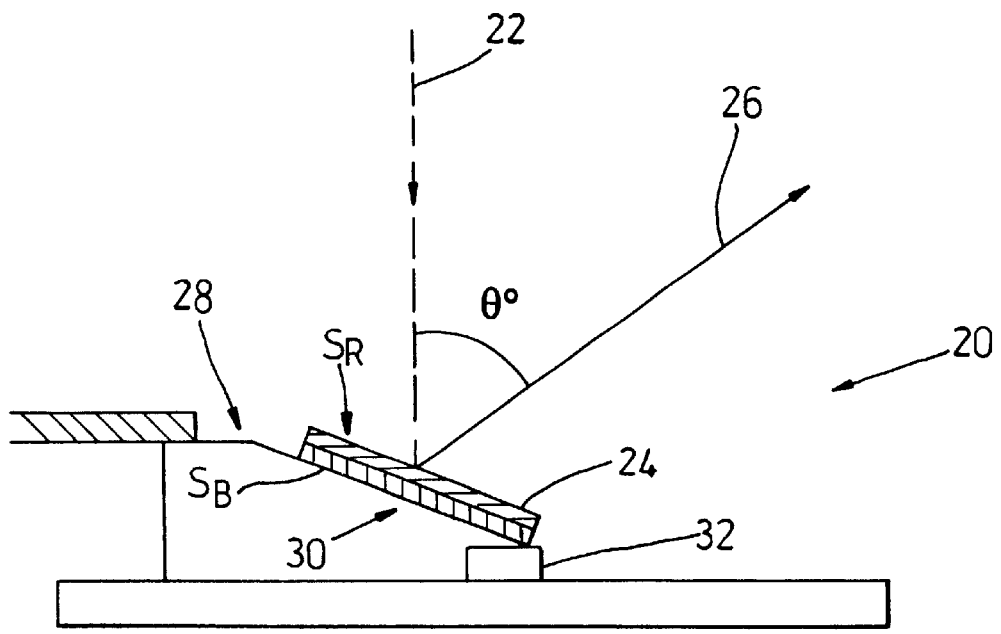
FIG. 2 is a sketch of a MEMS mirror device illustrating the paths of incident and reflected light beams.

FIG. 2 illustrates a MEMS device 20 from a different perspective. Incident light 22 is reflected by reflective mirror surface 24 to form a reflected beam 26. The direction of the reflected beam 26 can be modulated by controlling the positioning of the mirror 30 using actuator 28. For example, the positioning of the actuator 28 can be controlled by suitable electrical means 32.

Figure 3:
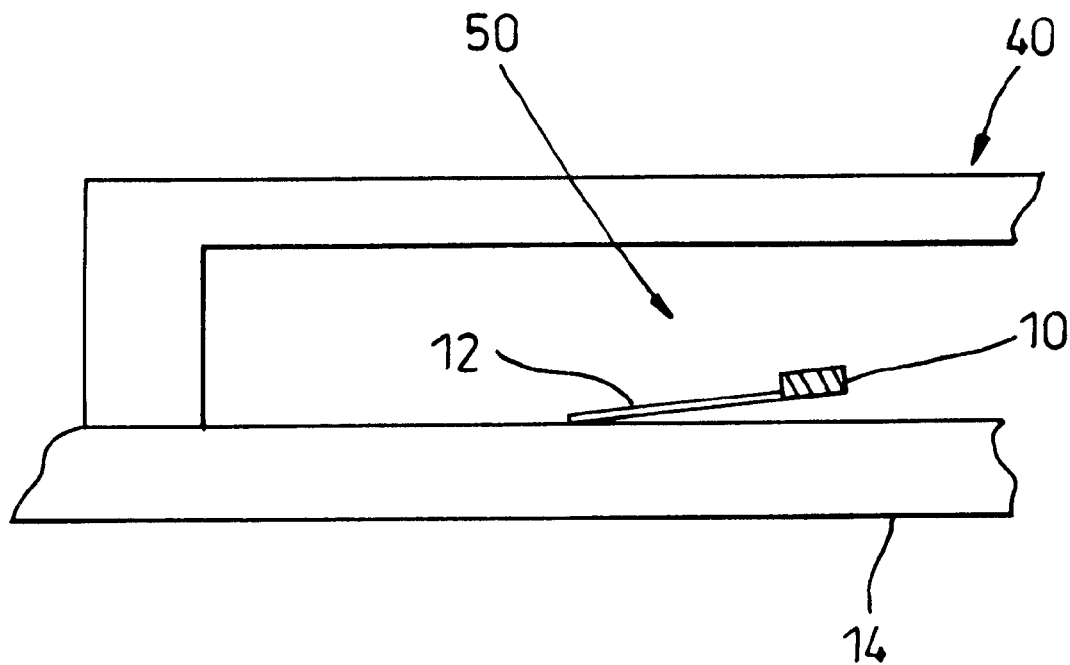
FIG. 3 is a sketch of a packaged MEMS mirror device.

FIG. 3 illustrates a packaged MEMS device similar to that sketching in FIG. 1. In FIG. 3, the device is packaged by sealing the mirror 10 and actuator 12 or array thereof using a cover 40 and beams of light propagate in free-space within the packaged area. The cavity 50 forming the mirror environment is sealed, preferably hermetically sealed. The atmosphere around the MEMS device is therefore isolated from the external atmosphere.

Selection of a suitable atmosphere to increase rate of heat dissipation of the MEMS device can be considered theoretically in conjunction with FIG. 2. In FIG. 2, the mirror 30 has a reflective surface $S_R$, and a rear surface $S_B$. Typical reflective coating for MEMS mirrors include, for example, gold, chromium or aluminium or alloys thereof.

A suitable atmosphere can be selected according to the anticipated thermal range over which the device is to be operated. For example, the thermal conductivities of various gases in $Wm^{-1}K^{-1}$ for a range of temperatures are summarised below:

|  | 0° C. | 20° C. | 40° C. | 60° C. | 80° C. | 100° C. |
|---|---|---|---|---|---|---|
| Air | 0.0238 | 0.0257 | 0.0273 | 0.0288 | 0.0300 | 0.0309 |
| Nitrogen | 0.0237 | 0.0256 | 0.0272 | 0.0285 | 0.0297 | 0.0307 |
| Oxygen | 0.0242 | 0.0263 | 0.0281 | 0.0296 | 0.0309 | 0.0320 |
| Helium | 0.1440 | 0.1504 | 0.1568 | 0.1634 | 0.1700 | 0.1766 |
| Hydrogen | 0.1294 | 0.1385 | 0.1467 | 0.1540 | 0.1604 | 0.1660 |
| Neon | 0.0461 | 0.0487 | 0.0510 | 0.0531 | 0.0548 | 0.0563 |
| Argon | 0.0162 | 0.0174 | 0.0186 | 0.0197 | 0.0208 | 0.0219 |

This table illustrates that by selecting a packaging atmosphere comprising helium, or a packaging atmosphere having a composition including a high proportion helium, the thermal conductivity of the packaging atmosphere is greatly improved over that of air, or nitrogen. The power handling capability of the MEMS device is dependent upon the material used in the MEMS. For a given MEMS, use of a higher thermal conductivity medium will directly improve power handling capability but the extent is highly dependent upon implementation.

As an example of how this leads to a higher level of thermal dissipation from a MEMS type device, consider the following embodiment of the invention in which heat dissipation from a MEMS mirror device is modelled. Heat can be lost from the mirror surfaces to the surrounding atmosphere by conduction. This conduction can be modelled by approximating the MEMS mirror device to a disc, and by treating the problem as equivalent to conduction from a disc into a semi-infinite medium.

Using this approximation, the heat loss from the disc $HL_D$ can be modelled as:

$$HL_D = 2\kappa\pi a\Delta T \qquad (1)$$

where $\kappa$=thermal conductivity of the atmosphere; and a=total disc surface area=area of $S_B$+area of $S_R$, and $\Delta T$ is the thermal temperature change.

Heat will also be conducted from the mirror 10 along the actuator 12 to the substrate 14, and conducted from the actuator 12 into the surrounding atmosphere 50.

Approximating the conduction loss into the packaging atmosphere by considering a 'boundary layer' thickness of the order of the actuator width, the heat loss through the actuator 12 can be approximated by $$HL_A = \frac{k_{Si}wtT_o}{x_o\tanh(l/x_o)} \qquad (4)$$

for a silicon actuator.

Where $\kappa_{Si}$=thermal conductivity of silicon;

$$x_o = \sqrt{\frac{k_{Si}wt}{2k}};$$

t=actuator thickness; w=actuator width; and l=actuator length.

Total rate of heat flow $HL_{TOTAL}$ from MEMS device into the surrounding atmosphere is therefore $$HL_{TOTAL} = HL_S + HL_A = 2\kappa\pi a\Delta T + \frac{k_{Si}wtT_o}{x_o\tanh(l/x_o)}$$

Heat Loss of a MEMS Mirror in Air

For example, for a mirror of diameter=100 $\mu$m and actuator thickness 1 $\mu$m, actuator width=100 $\mu$m, actuator length=400 $\mu$m, in an air atmosphere ($\kappa$=0.025, $x_0$=565 $\mu$m), the heat loss from the mirror surfaces $HL_S$ is approximately 16 $\mu WK^{-1}$ and from the actuator, $HL_A$ is approximately 46 $\mu WK^{-1}Wm^{-1}K^{-1}$. Thus, if a maximum permissible temperature rise is $T_{rise}$, the thermal dissipation at the mirror is $T_{rise}$x ($HL_S$+$HL_A$). For a 100° C. temperature rise, the thermal dissipation at the mirror in an air atmosphere is: 6.2 mW.

Thermal characteristics for the packaging atmospheres of the invention can now be contrasted with the above. Consider the table below which illustrates the relative thermal efficiencies of alternative atmospheres with respect to air:

|  | 0° C. | 20° C. | 40° C. | 60° C. | 80° C. | 100° C. |
|---|---|---|---|---|---|---|
| Air | 1.00 | 1.00 | 1.00 | 1.00 | 1.00 | 1.00 |
| Nitrogen | 1.00 | 0.99 | 0.99 | 0.99 | 0.99 | 0.99 |
| Oxygen | 1.02 | 1.02 | 1.03 | 1.03 | 1.03 | 1.04 |
| Helium | 6.04 | 5.85 | 5.74 | 5.68 | 5.67 | 5.71 |
| Hydrogen | 5.43 | 5.39 | 5.36 | 5.35 | 5.36 | 5.37 |
| Neon | 1.93 | 1.89 | 1.87 | 1.84 | 1.83 | 1.82 |
| Argon | 0.68 | 0.68 | 0.68 | 0.69 | 0.70 | 0.71 |

In the invention, a packaging atmosphere is selected to include a sufficient proportion of neon, or helium to provide a sufficiently higher thermal efficiency than air or nitrogen. It may be desirable to include other gases such as argon, but to include a sufficient proportion of helium to provide the desired thermal conductivity.

One embodiment of the invention uses a packaging atmosphere comprising helium. Approximating the thermal conductivity of helium to $\kappa$ =0.15$Wm^{-1}K^{-1}$, and taking $x_0$=230 $\mu$m, for helium, $HL_{TOT}$=96 $\mu WK^{-1}$+170 $\mu WK^{-1}$ This increases the thermal dissipation at the mirror surface by a factor of over 2.7 for helium compared with that of air, which extends the power handling or the mirror similarly by a factor of almost three.

The above embodiment illustrates that if a maximum permissible operation temperature rise of 100° C. is considered, the maximum thermal dissipation at the mirror in air is 6.2 mW. This can be contrasted with a maximum thermal dissipation of 17 mW for a helium atmosphere.

Estimating 98.5% as the reflectivity of gold at 1.5 microns provides an estimate of the power handling capacity of the mirror as 410 mW for air. In contrast, the power handling of the same mirror in a helium atmosphere is approximately 1.1 W.

The estimated 98.5% figure is taken from data (which can vary) provided by manufacturers for the reflectivity of gold coatings at 1.5 microns. The maximum allowable heat dissipation is 6.2 mW in air and 17 mW in helium, thus if 98.5% of the laser power is reflected, the remaining 1.5% must be absorbed and thus contribute to the heating. So if the incident power is P then, then:

For Air: 1.5% of P is 6.2 mW, i.e. P=410 mW
For Helium 1.5% of P is 17 mW, i.e. P=1.1 W A similar analysis can be performed for other atmospheres to obtain the following:

Air, Oxygen and Nitrogen, P=410 mW
Helium, P=1100 mW
Hydrogen, P=1030 mW
Neon, P=540 mW
Argon, P=360 mW.

The above illustrates the advantages to be gained by using a MEMS packaging atmosphere having a high thermal conductivity such as a helium or predominantly helium atmosphere. By selecting a suitable packaging atmosphere having a sufficiently higher thermal conductivity, for example, by including a proportion of Helium in a range taken from: at least 5% wt, between 10% wt to 20% wt, between 20% wt to 40% wt, between 40% wt to 60% wt, between 60% wt to 80% wt, and 100% helium, the heat dissipation from the mirror can be increased and the potential for damage to the mirror surface reduced.

A MEMS device which has a thermally dependent characteristic, for example, a coating diffusion coefficient, a coefficient of expansion, etc, has a preferred operating temperature. The preferred operating temperature is selected to ensure the MEMS device functions in a stable manner. It is desirable to ensure the MEMS device is thermally stable and remains within a predetermined temperature range including the preferred operating temperature during the normal operation of the MEMS device.

A MEMS device, for example, a MEMS mirror, having thermally dependent characteristics will function less efficiently if exposed to temperatures which are above its preferred operating zone. For example, a MEMS mirror will experience a degradation in its reflectivity due to diffusion of its mirror coating if the temperature increases above a preferred operating zone.

Figure 4:
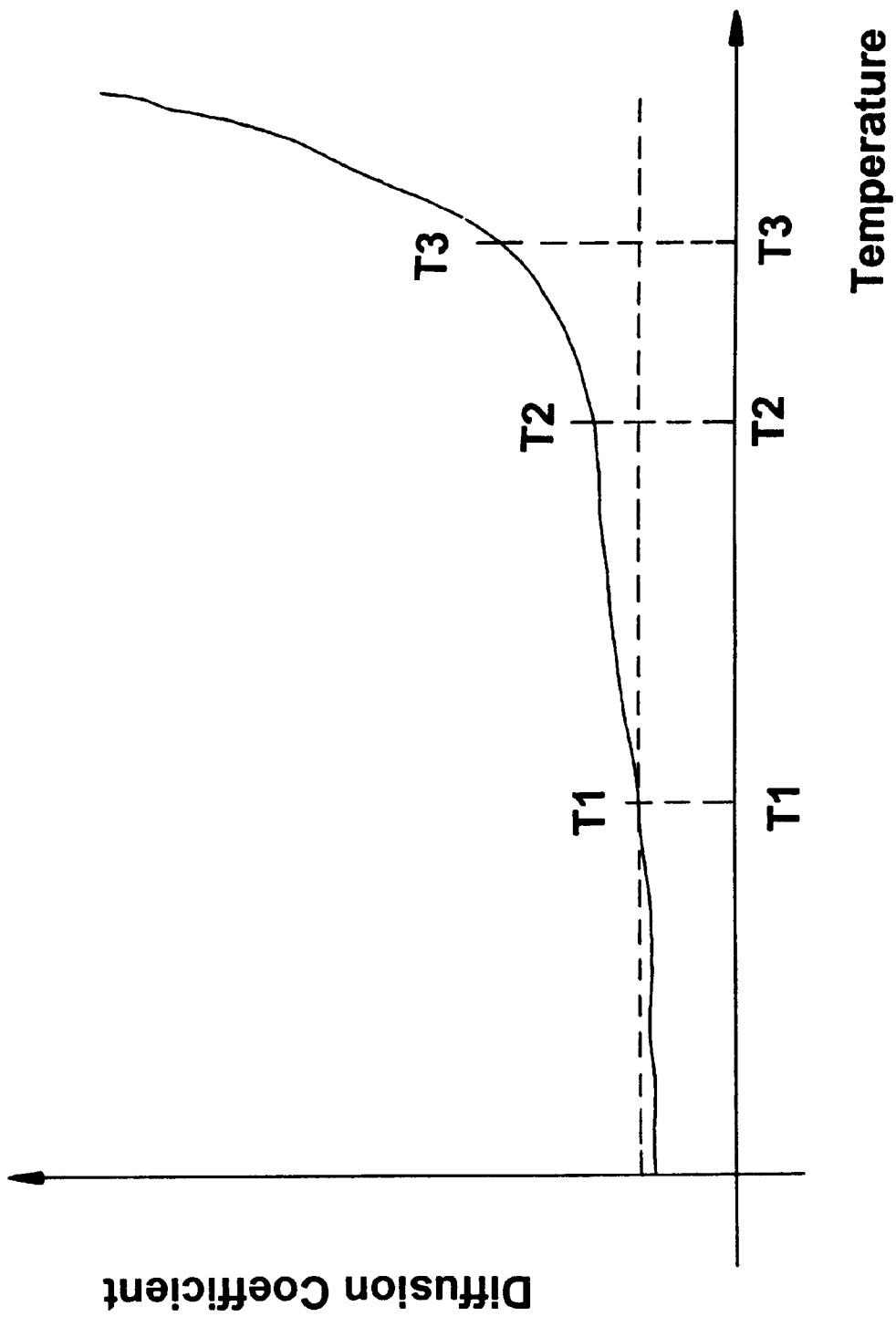
FIG. 4 is a sketch illustrating the temperature dependence of the diffusion rates of a reflective coating into a substrate.

This is illustrated by way of example in FIG. 4, in the context of a reflective coating on a substrate whose temperature dependence for diffusion is known to obey the Arrenhuis law, i.e. $D \propto e^{-E_A/KT}$, where D=the diffusion rate for the reflective coating into the substrate, $E_A$=activation energy, K =Boltzmann's constant, and T=temperature dependence. The substrate may have any known composition for use in MEMS mirror devices for example, silicon or a silicon-based substance. FIG. 4 is a sketch illustrating the temperature dependence of the diffusion rates of a reflective coating such as Gold into a substrate, for example, Zinc or Silicon, which exhibits such a temperature dependence.

FIG. 4 illustrates that diffusion does not rise sharply for temperatures less than a certain lower limit, indicated here as T1. Above T1, the diffusion coefficent begins to rise, however, the rise is not too dramatic over a limited range, here indicated as between T1 and T2. In this range, the mirror coating would diffuse more rapidly, but the device could possibly still operate. Above T2, the diffusion coefficient increases substantially, and diffusion becomes much more potentially damaging above T3.

It is therefore highly advantageous to retain a MEMS device within its temperate operating zone, i.e., preferably below T1, and to ensure that exposure to temperatures above T1, but below T2 say, is minimal. Prolonged exposure to temperatures in the T1 to T2 zone can result in substantial deterioration of a mirror coating as the mirror coating diffuses more rapidly into the substrate, but, for example, the device may not fail.

In the event of a power surge increasing the temperature to above T3, the diffusion rate can increases to a point where the degradation of the mirror coating effectively destroys its reflective properties. It is therefore very desirable to keep the thermal environment of the MEMS device well below T3 at all times.

The invention enables a MEMS device having a reflective coating to be operated over a power range which extends to higher powers than the same device can operate over in a conventional atmosphere. This is because the higher the helium content of the atmosphere, the faster heat can be dissipated, and it is possible to cool the MEMS device more rapidly. This reduces the amount of time a MEMS device (packaged in an atmosphere according to the invention) is exposed to temperatures in the T1 to T2 zone. Moreover, it reduces the likelihood of a MEMS device being exposed to temperatures above T3.

Other variations and modifications will be apparent to those skilled in the art without departing from the spirit or scope of the invention. For example, the term MEMS device extends to any micro-mechanical actuator, motor or sensor whose operating characteristics are adversely affected by heat. An operating characteristic of a MEMS device may include, for example, a degradation mechanism of the device. Such operating characteristics may be extremely sensitive to treat, for example, degradation mechanisms dependent on the diffusion rate illustrated in FIG. 4 can follow an Arrenhuis law.

Although the invention has referred to inert atmospheres such as helium or predominantly helium, and to neon and argon, the invention extends to any atmosphere exhibiting a thermal conductivity greater than that of air or other nitrogen based atmospheres such as are conventionally used in packaging.

The invention also extends to any atmosphere which, when blown over a MEMS device by a suitable atmospheric circulator enables a higher rate of heat flow from the MEMS device into the atmosphere to occur. Suitable atmospheric circulators include a fan, or a design incorporated in the MEMS device in which a convected airflow is established to enhance the flow of cool atmosphere over the surfaces of the MEMS device. Incorporating a fan or forced convection may result in some improvements in the overall performance of the MEMS device. However, it is to be understood that for small scale geometric features, for example below 0.1 mm, it would be necessary to produce boundary layers of a similar magnitude to have a significant impact on heat-loss.

What is claimed is:

1. A packaging atmosphere packaging a MEMS device, the packaging atmosphere selected to have a thermal conductivity exceeding the thermal conductivity of air.

2. A packaging atmosphere as claimed in claim 1, wherein the packaging atmosphere improves the thermal stability of the device.

3. A packaging atmosphere as claimed in claim 1, wherein the MEMS device has at least one thermally dependent characteristic.

4. A packaging atmosphere as claimed in claim 3, wherein at least one said thermally dependent characteristic affects the functionality of the MEMS device.

5. A packaging atmosphere as claimed in claim 4, wherein the functionality of the MEMS device is enhanced by the packaging atmosphere.

6. A packaging atmosphere as claimed in claim 5, wherein the packaging atmosphere enables the MEMS device to handle a higher level of optical power than the level of optical power the MEMS device can handle when packaged in an atmosphere taken from the group of: air and nitrogen.

7. A packaging atmosphere as claimed in claim 1, wherein the packaging atmosphere has a thermal conductivity exceeding 0.03 $Wm^{-1}K^{-1}$.

8. A packaging atmosphere as claimed in claim 1, the packaging atmosphere including helium in a proportion taken from the group of:
   at least 5% wt; 5% wt to 10% wt; 50% wt to 75% wt; more than 75% wt; 100% wt.

9. A packaging atmosphere as claimed in claim 1, wherein the thermal efficiency of the packaging atmosphere exceeds the thermal efficiency of air by a factor of 1.5.

10. A method of packaging a MEMS device, comprising:
   a. surrounding a MEMS device in a packaging atmosphere which improves the thermal stability of the device; and
   b. hermetically sealing the MEMS device within the packaging atmosphere, wherein the device is sealed in a packaging atmosphere having a thermal conductivity exceeding the thermal conductivity of air.

11. A method of packaging a MEMS device as claimed in claim 10, wherein the packaging atmosphere is selected to have composition including a proportion of helium taken from the group consisting of:
   at least 5% wt; 5% wt to 10% wt; 50% wt to 75% wt; more than 75% wt; 100% wt.

12. A method of packaging a MEMS device, comprising: surrounding a MEMS device in a packaging atmosphere which improves the thermal stability of the device; and hermetically sealing the MEMS device within the packaging atmosphere, wherein the device is sealed in a packaging atmosphere having a thermal conductivity exceeding $0.03 Wm^{-1}K^{-1}$.

13. A packaged MEMS device, the MEMS device having thermally dependent characteristics affecting its functionality, the packaged MEMS device comprising:
   a MEMS device surrounded by a packaging atmosphere and sealed within the packaging atmosphere by a packaging material, the packaging atmosphere having a thermal conductivity exceeding the thermal conductivity of air.

14. A packaged MEMS device as claimed in claim 13, wherein the packaging atmosphere extends the range over which the device is thermally stable.

15. A packaged MEMS device as claimed in claim 13, wherein the packaging atmosphere has a thermal conductivity exceeding $0.03 \ Wm^{-1}K^{-1}$.

16. A packaged MEMS device as claimed in claim 13, wherein the packaging atmosphere is selected to have composition including a proportion of helium taken from the group of: at least 5% wt; 5% wt to 10% wt; 50% wt to 75% wt; more than 75% wt; 100% wt.

17. A packaged MEMS device as claimed in claim 13, wherein the thermal efficiency of the packaging atmosphere exceeds the thermal efficiency of air by a factor of 1.5.

18. A packaged MEMS device as claimed in claim 13, wherein the MEMS device is a MEMS mirror-type device.

19. A packaged MEMS device as claimed in claim 13, further including an atmospheric circulator.

20. A packaged MEMS device as claimed in claim 19, wherein the atmospheric circulator is a fan.

21. A packaged MEMS device as claimed in claim 20 wherein the MEMS device is packaged so that the packaging atmosphere is drawn over surfaces of the MEMS device to increase the heat flow from the surfaces to the packaging atmosphere.

22. An optical switch having a packaged MEMS mirror device, the packaged MEMS mirror device comprising:
   a MEMS mirror device surrounded by a packaging atmosphere and sealed within the packaging atmosphere by a packaging material, the packaging atmosphere having a thermal conductivity exceeding the thermal conductivity of air.

* * * * *